United States Patent
Beatty et al.

(10) Patent No.: US 7,028,158 B1
(45) Date of Patent: Apr. 11, 2006

(54) STORAGE VIRTUALIZATION ENGINE

(75) Inventors: Timothy Beatty, Rancho Santa Fe, CA (US); Todd Parsons, Chula Vista, CA (US)

(73) Assignee: Beatty and Company Computing, Inc., San Diego, CA (US)

( * ) Notice: Subject to any disclaimer, the term of this patent is extended or adjusted under 35 U.S.C. 154(b) by 643 days.

(21) Appl. No.: 10/005,531

(22) Filed: Nov. 2, 2001

(51) Int. Cl.
*G06F 12/00* (2006.01)

(52) U.S. Cl. ............... 711/202; 711/165; 711/203; 711/207

(58) Field of Classification Search ............ 711/202, 711/203, 207, 165
See application file for complete search history.

(56) References Cited

U.S. PATENT DOCUMENTS

| 4,467,421 A | 8/1984 | White |
| 5,561,786 A | 10/1996 | Morse |
| 5,671,439 A | 9/1997 | Klein et al. |
| 5,930,827 A * | 7/1999 | Sturges ............... 711/170 |
| 5,991,542 A | 11/1999 | Han et al. |
| 6,119,214 A | 9/2000 | Dirks |
| 6,122,685 A * | 9/2000 | Bachmat ............... 710/74 |
| RE36,989 E | 12/2000 | White |
| 6,173,293 B1 | 1/2001 | Thekkath et al. |
| 6,233,666 B1 | 5/2001 | Mathews et al. |
| 6,286,089 B1 * | 9/2001 | Greiner et al. ............ 711/203 |

FOREIGN PATENT DOCUMENTS

| JP | 304 604 3 A | 1/1991 |
| JP | 411 1029 A | 4/1992 |

* cited by examiner

*Primary Examiner*—Reba I. Elmore
(74) *Attorney, Agent, or Firm*—Gordon & Rees LLP (57) ABSTRACT

A method and system for dynamic file allocation is disclosed. In the system, an input device receives a data object which is sent to an allocation device. The allocation device is comprised of a publishing point which contains a virtual mapping system that directs the data object to an entry in the storage object.

23 Claims, 8 Drawing Sheets

STORAGE VIRTUALIZATION ENGINE

BACKGROUND OF THE INVENTION

This invention relates to the dynamic allocation of data into a file system. Typically, the capacity of prior art systems is based upon the total allocated capacity of the system. Additional storage capacity is generally added on an as needed basis. If additional storage capacity is needed, the system is shut down so this storage can be physically added and the system reconfigured. These interruptions to system operation result in wasted time and increased complexities for the user.

Figure 1:
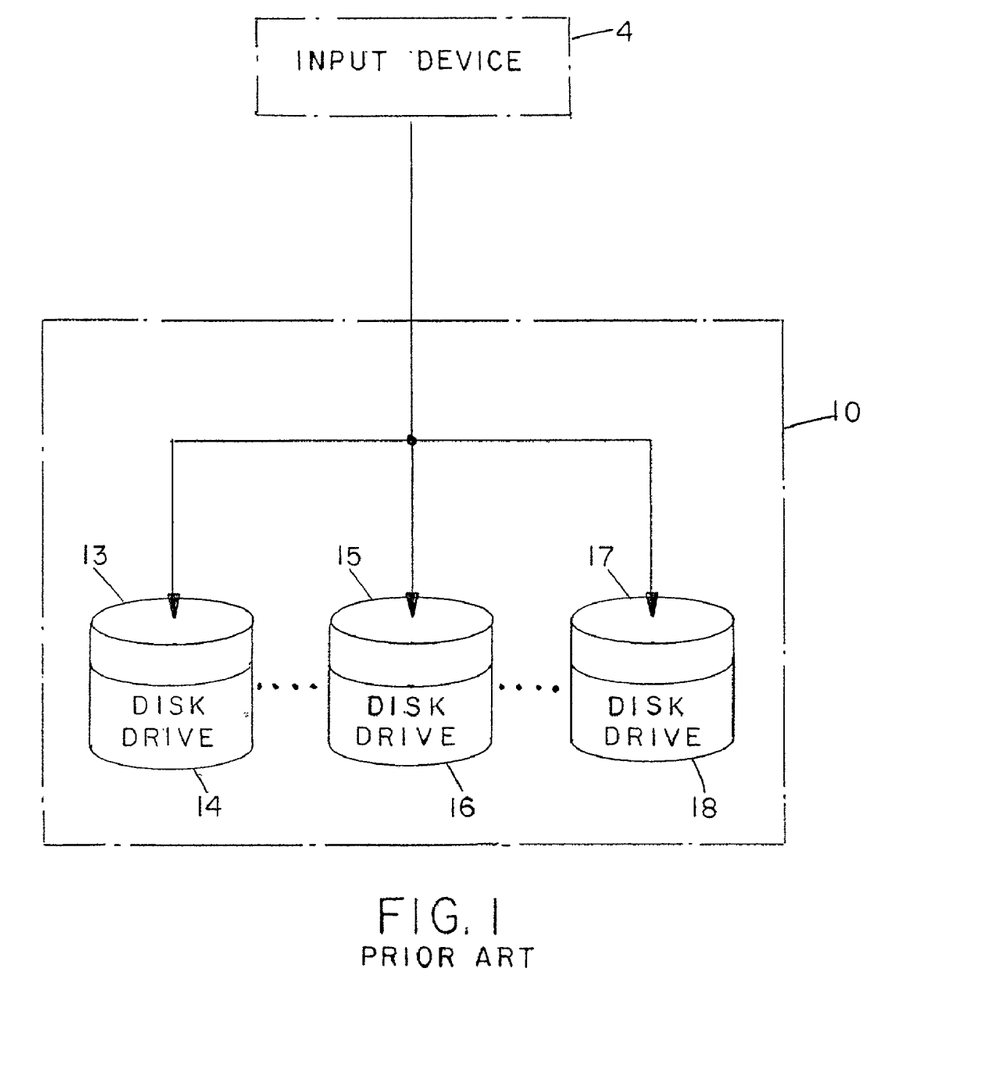
FIG. 1 illustrates a prior art system for file allocation.

FIG. 1 illustrates a prior art file system. In this system, an end user or operator enters data objects, such as a byte, file or directory, into an input device 4. In addition to end users, Applications running on the host system can enter data objects. The data object is sent to a data container 10 for storage on data storage devices, such as disk drives 14, 16 and 18. Each data storage device contains a reference table, 13, 15 and 17, which contains the address of the location where the data object is to be stored. Generally a range of addresses is typically assigned by programs running on the computer for storage of its data to a given block. Once a data object is assigned to a given block of storage addresses, the addresses are not changed even if additional storage is added or there is reduced storage demand.

U.S. Pat. No. Re. 36,989 illustrates a virtual storage system which comprises a processor for allocating space on a data storage means to blocks of sequential data supplied by a host computer. The processor allocates addresses on disk memory means to the data and divides the user data set into subportions by the controller, if necessary, which causes the data to flow from a temporary storage means through disk interface means onto the disks. The disk addresses are then stored by, for example, the user data set name in address memory. When the host later calls for the same data set, the virtual storage system's controller refers to the address memory and determines where on the various disks the data set is stored. The data can then be transmitted back to the host via the temporary storage means for further processing. However, the data cannot be dynamically allocated to other locations on the disks when a disk is too close to capacity so all data can be stored optimally in the data storage means. As a result, much of the file storage capacity that has been allocated remains unused. If there is no data small enough to fit in the remaining space of a disk, that space is left unused. Storage administrators thus cannot manage capacity based on the utilized capacity.

Presently there does not exist a system that tracks the utilization of all file systems placed under its control and dynamically (in real time) re-allocates container space virtually to the user that virtually transfers data to an underutilized container when the current container is running out of space. Furthermore, there needs to be a way to create new containers and resize existing ones.

SUMMARY OF THE INVENTION

The present invention relates to a system and method that provides for the virtualization of file systems through multiple levels of indirection and abstraction and the allocation of capacity as required. It utilizes only the storage capacity necessary to store the information on a system.

It is an advantage of the present invention to provide for managing storage capacity based on the minimum and utilized capacity rather than the allocated capacity based upon an allocated block of space, as well as adding storage capacity anywhere and at any time without system disruptions or downtime.

In an exemplary embodiment of the present invention, data is stored on disks in containers. In order to optimally allocate disk space, the system closely monitors the container content. When a container reaches a predetermined percentage of capacity, the system allocates additional capacity to it. If the amount of data stored in a container becomes significantly below its capacity, the system will deallocate some space that has previously been allocated to the container.

The system maintains a list/record of the capacity consumption of each container and maps the data object to a physical location on the container. The list/record, known as a publishing point, also indicates to the system where in the container each data object is located. Each container is associated with a specific publishing point and when an operator or end user enters a data object, the system stores the data object in the container in which storage would be optimized. It then updates the appropriate publishing point associated with the container. The publishing point is also updated to indicate to the system the physical location in the container of the data object. Similarly, when an operator or end user deletes a data object, that data object is removed from its container and its entry is removed from its publishing point.

The use of publishing points and containers allows the system to allocate data optimally on the storage space. The system monitors the capacity consumption of containers to see both that they are not too much larger than the amount of data they contain and that they have a specified, limited amount of available space. If the system sees that the amount of data in a container is too close to its capacity, it will allocate additional space for the container. Publishing points and containers also help the system optimally allocate data if a container is sufficiently below capacity. If the system detects that a container is sufficiently below capacity, it will deallocate some of the unused space in the container.

The system uses container monitors and a system-specified quantity of space known as an extent to monitor the capacity of the containers. A container increases or decreases by one extent at a time. The container manager ensures that the amount of free storage space in the container is greater than one and less than three extents. If a container is filling up, and its container monitor detects that there is less than one extent of free space in the container, it will allocate an additional extent of storage space to that container. If data is being removed from a container, when its container monitor detects that is has more than three extents of free space available, it will deallocate one extent of space and decrease the size of the container accordingly.

A container may not be larger than a maximum size. To ensure that a container never grows larger than its maximum size, each container has a relocation threshold. The relocation threshold is a percentage of the maximum size of the container. If a container monitor detects the percentage of occupied space of the container is equal to or greater than the relocation threshold that has been set, it will relocate enough data from its container to another container. Similarly, a container may not be below a minimum size. The above described system allows for the optimal allocation of storage space.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 2:
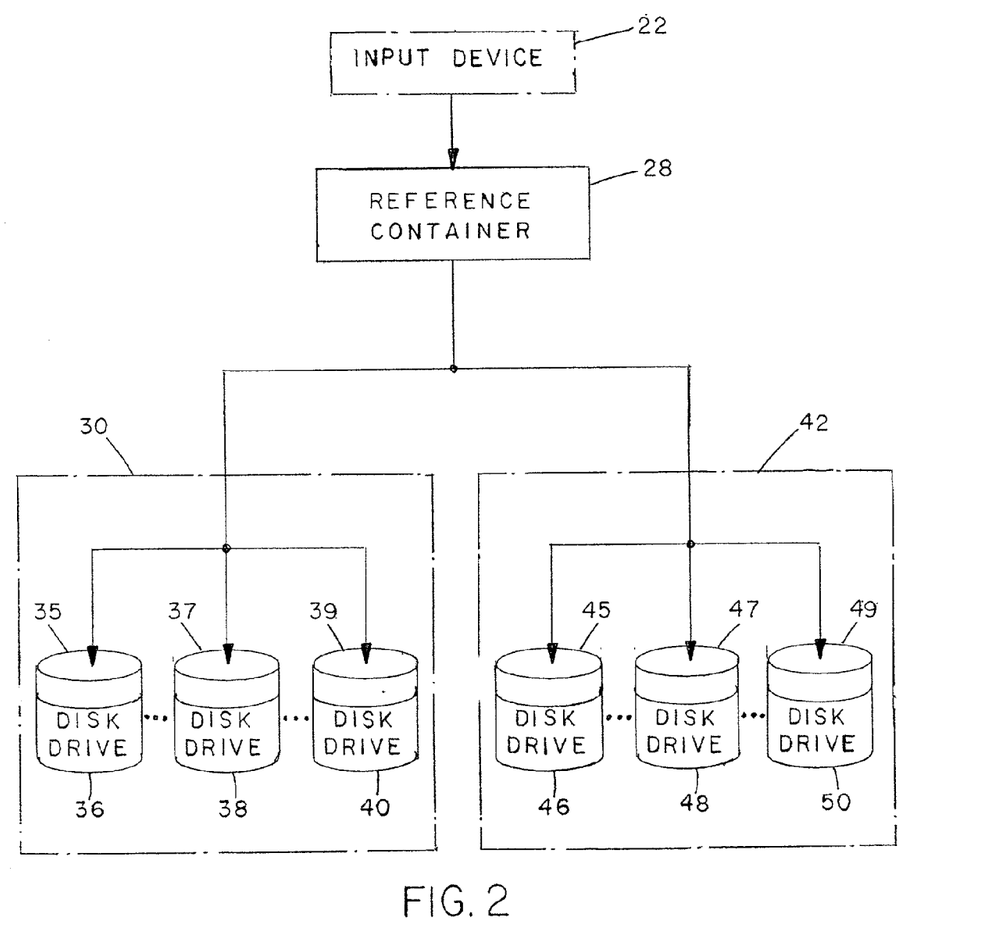
FIG. 2 illustrates the system for dynamic file allocation of the present invention.

FIG. 2 illustrates a file system of the preferred embodiment of the virtual storage system of the present invention. The file system dynamically allocates storage when an end user or operator enters a data object, which can include a byte, a file or a directory, into an input device 22. The input device can include a keyboard, speech control, key pad or any other device capable of inputting data. Data objects can also be entered by an Application on the host system. Once entered, the data object is assigned a storage address by the end user, such as the C: drive on a personal computer. This storage address is sent to a reference container 28 where it is mapped to a location data containers 30 and 42. Although two data containers are shown, additional data containers may be added to the system. Containers are generalized storage objects, such as an operating system, area or block of space on a disk or any other device able to store data, that can increase or decrease in size to accommodate the amount of data that is to be stored. The reference container is a specialized container called a publishing point that contains reference objects which are any well defined set of bits (1's and 0's), that indicate the location or address of the data object in the data container.

The data objects are stored in the data containers 30 and 42 on data storage devices, such as disk drives 36, 38, 40, 46, 48, and 50. Data storage devices can include a single disk drive, a volume of disks, a network drive, a partition of a hard disk or any other device that stores data. Each data storage device contains a reference table 35, 37, 39, 45, 48 and 49, such as file allocation tables or inodes, which map the data object to its storage location on the data storage device. Although three data storage devices are shown in each container, additional storage devices may be utilized.

Figure 3A:
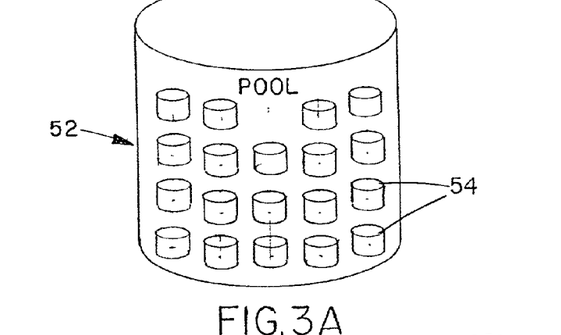
FIG. 3A illustrates a storage pool from the system for dynamic file allocation of the present invention.

Storage space for the containers is obtained from storage pools. FIG. 3A illustrates a storage pool 52 utilized in the present invention. A storage pool is comprised of blocks or sectors of space 54. As a container requires additional storage, additional sectors are allocated to the container. Additional sectors 54 can also be added to the storage pool 52 by an operator or end user, such as additional disks, to increase its size.

Figure 3B:
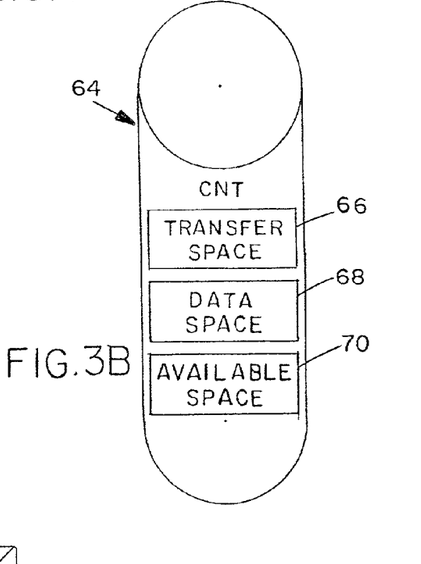
FIG. 3B illustrates a data container from the system for file allocation of the present invention.

Turning now to FIG. 3B, a block diagram of a representative data container 64 used in the present invention is illustrated. Each container used for storing data objects is divided into three sections or spaces: a transfer space 66, a data space 68 and an available space 70. The transfer space is a region of space on the data container 64 used for the temporary storage of data objects being relocated or transferred from one container to another. The data space is a region of space on the data container 64 used for the permanent storage of data objects and the available space is a region of space used for the storage of unused space in the data container 64.

When data objects are relocated from a first data container to a second data container, they first flow from the data space of the first data container into the transfer space of the second data container. To accommodate the data objects, storage is taken from the available space of the second data container and given to the transfer space to temporarily store the data objects. From the transfer space, the data objects flow into the data space. If there is not enough storage available in the data space, storage is also taken from the available space. However, if the available space becomes too small, storage virtualization engine can obtain additional storage or sectors of space 54 from the storage pool 52 and add it to the container's available space. When the container can no longer accept data objects, any unused storage is returned to the storage pool 52 for other containers to utilize. A maximum size can be assigned to the data container by the operator or end user to prevent it from increasing to an unreasonable size, i.e. a size that cannot be backed up in a timely manner using the operator's available backup equipment.

Furthermore, operators instruct the container when it is necessary to relocate data objects to another container by setting a relocation threshold on a container. The relocation threshold is a percentage of the maximum allowable size of a container. When the relocation threshold is reached in a container, data objects are relocated. If there are no available containers for transferring the data objects, the storage virtualization engine will create a new container by obtaining blocks or sectors of space 54 from the storage pool 52. If there is not enough blocks or sectors of space available in the storage pool, the operator or end user will be instructed to physically add additional disk space, such as an additional disk drive. This is done without having to shutdown the system. The storage virtualization engine system automatically reconfigures the system to recognize the additional hard drive.

Figure 3C:
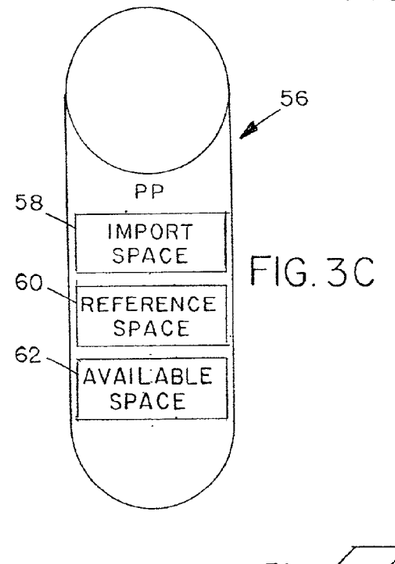
FIG. 3C illustrates a publishing point from the system for dynamic file allocation of the present invention.

As indicated previously, each data object to be stored in the system is assigned a reference object, which is any well defined set of bits (1's and 0's), that indicates the location or address of the data object in the container. The reference container 28, also called publishing points 56, store the reference objects. Any application requiring access to the data objects must refer to it via its reference object in the publishing point.

Using a virtual storage system with reference objects saves the necessity of Applications needing to change how they reference stored data objects when they are relocated from one container to another. In other words, the publishing point provides a means of accessing data where Applications need not be aware of the underlying containers. Thus, it is possible to group large numbers of data containers under a single publishing point and provide access to vast amounts of data through a single manageable entity. Furthermore, utilizing a publishing point provides a method of presenting an essentially unlimited amount of storage from multiple data containers as though it were a single storage device.

FIG. 3C illustrates a block diagram of a publishing point 56, a specialized container. Each publishing point is divided into three sections or spaces: an import space 58, a reference space 60, and an available space 62. The import space 58 is a block of space that is used for temporarily storing data objects. The reference space 60 is a block of space that is used for the permanent storage of reference objects and the available space 62 is a block of space that stores the remaining unused space in the publishing point 56.

When a data object is entered by an operator, it is first placed in the import space 58 of the publishing point. To temporarily store the data object in the publishing point 56, the storage virtualization engine first verifies that there is adequate space available in the import space 58. If additional space is required, it is obtained from the available space 62 of the publishing point 56. Upon relocation to another container, the additional space that was acquired is sent back to the available space 62 of the publishing point. Periodically the storage virtualization engine polls the import space 58 to check and see if there are currently any data objects waiting to be placed in a container. If a data object is located, a block of space in the publishing point which represents a reference object, is allocated to the reference space 60 to refer to the data object. To accommodate the reference objects, storage is acquired from the available space 62. If the available space begins to get too small, the storage virtualization engine can acquire additional storage from the storage pool 52 and add it to the publishing point's available space 62. Generally, publishing points do not require vast amounts of storage.

In order to properly manage the storage system in real time, the storage system utilizes four distinct types of software processes that must run in parallel. The first process is a command interface (CI) which allows multiple operators to simultaneously submit queries to the storage virtualization engine. The second process is a mode manager which maintains all internal data structures by tracking publishing points, containers and data objects. Internal data structures include a publishing point record for each publishing point device, a list of container records under each publishing point record, a list of data objects under each publishing point record and a list of relocator records for ongoing relocation processes.

Furthermore, the mode manager coordinates relocations which require the physical relocation of data objects as well as updating internal data structures which reflect the data relocation. The third process is a container monitor which ensures that the container always has enough available space by acquiring it from the storage pool 52. Finally, the fourth process is a relocator. This process manages the relocation of data objects and is spawned for every data object which needs to be relocated. As a result, performance is maximized across systems with mulitple central processing units (CPUs). The container and relocator processes are also known as child processes.

The first process, CI, provides a standardized method for controlling storage virtualization. It enables an operator to (1) query information about the system while it is offline, such as version information, etc. (2) start the system (3) stop the system and (4) direct various modes of the system, such as importing data objects and balancing the data objects evenly among all containers. The CI submits requests to the mode manager, the second process, and the result from the mode manager is communicated back over an Interprocess Communication (IPC) channel to the CI. As can be see with reference to FIG. 4, multiple CIs 74, 76 and 78 can be running simultaneously, submitting requests from multiple operators.

Figure 4:
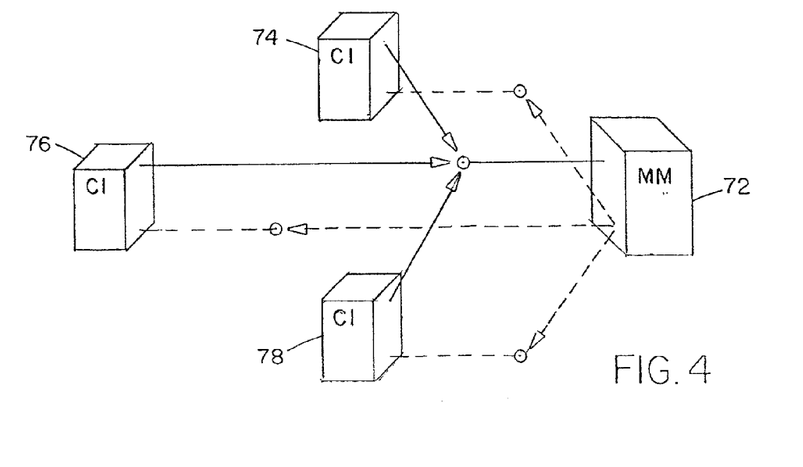
FIG. 4 illustrates multiple command interfaces communicating with the mode manager.

The second process, the mode manager 72, is used to manage all operational modes of the storage virtualization engine and maintains state information for storage under content management and coordinates the actions of the relocators, the fourth process, and container monitors, the third process. It receives instructions from the CI and detects the following signals from its environment (1) a signal indicating that the mode manager should reload the system configuration settings and (2) child signals which indicate that a child process, such as the container monitor processes and the relocator processes, has terminated.

The mode manager spawns the relocator (RLC) processes to relocate data when necessary and container monitor processes to monitor the allocation of space within the containers. It also detects the termination of these processes and reads the results of their activities on its child results pipe, which is an IPC channel used by the relocator and container monitor processes to communicate with the mode manager. If one of these processes was terminated improperly, the mode manager can restart it.

Figure 5A:
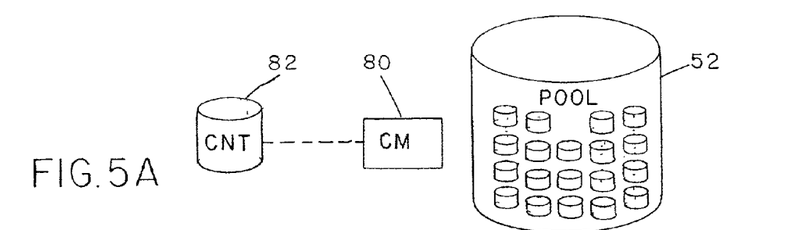
FIG. 5A illustrates a container being monitored to ensure it has enough storage capacity.
Figure 5B:
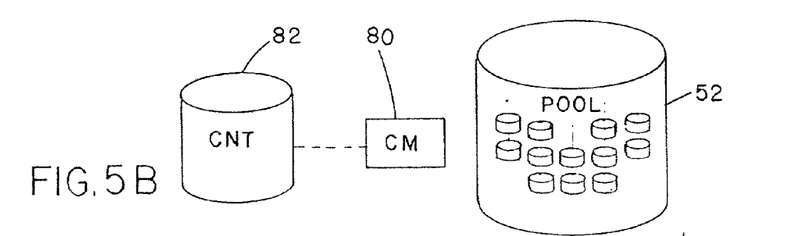
FIG. 5B illustrates a container monitor acquiring space from the storage pool to increase its size.

The third process is the container monitor. Each container is assigned a container monitor 80 by the mode manager which tracks the available and used space of the container. As can be seen in FIGS. 5A and 5B, the size of the container can increase or decrease as necessary. If the container monitor 80 determines that the container 82 requires additional space or storage, the space is obtained from the storage pool 52 and added to the container resulting in a container 82 that is larger in size. This, in turn, results in less available storage space in the storage pool.

Containers are increased or decreased by one extent at a time, where an extent is a system specified quantity of space defined by the end user or operator. Resizing of the container occurs constantly by the container monitor 80 so as to keep the available space greater than 1 extent and less than 3 extents, $e<a<3e$, where 'e' represents 1 extent and 'a' represents the space available in the container.

A data container that is reaching its relocation threshold requires additional space to be allocated or acquired for storage. When the space available in the container drops below 1 extent, the container monitor retrieves storage from the storage pool and increases the space available for storage by 1 extent, thus providing space for additional data objects. (The space could be a hard disk, a network drive, a partition of a hard disk, or anything else that stores data, for example the C: drive on a personal computer). When a data object is deleted from the storage space, the space is sent back to the storage pool. For instance, when the space available exceeds 3 extents, the space available is decreased by 1 extent making space available for other spaces from the pool.

Figure 6:
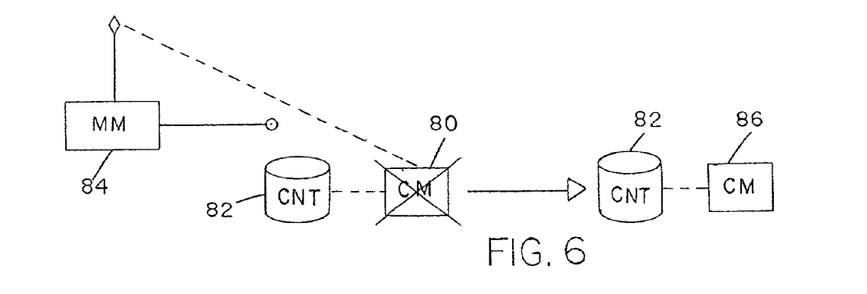
FIG. 6 illustrates the replacement of a defective container monitor.

The mode manager 84 monitors the container monitors to ensure they are functioning properly. If an improperly functioning or defective container monitor is detected, the mode manager spawns a new container monitor to replace the defective one. FIG. 6 illustrates an improperly functioning container monitor 80 assigned to container 82 being replaced by a new container monitor 86.

Figure 7:
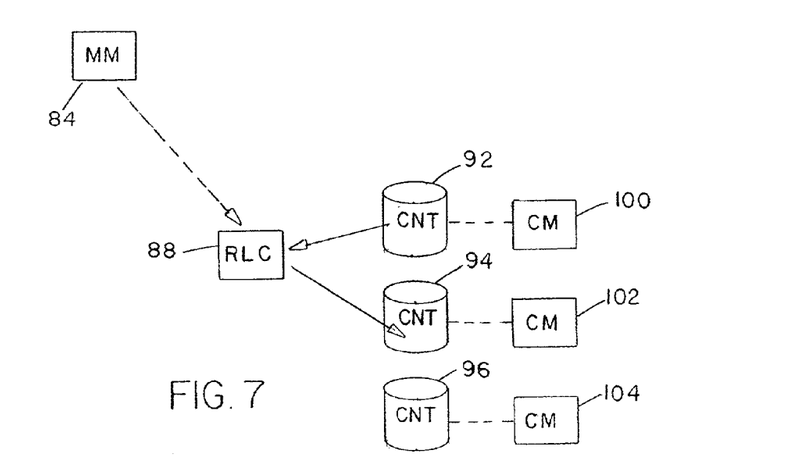
FIG. 7 illustrates the spawning of a relocator to assist in the relocation of a data object.

FIG. 7 illustrates the fourth process, the relocator 88. The relocator manages the relocation of data objects from a first data container 92 to a second data container 94 by issuing file system directives to transfer data objects from one data container to another. (The Storage Virtualization Engine accesses physical devices by issuing file system directives.) If the mode manager determines that the first data container 92 has reached its relocation threshold, a relocator 88 is spawned to perform the transfer of the data objects to the second data container 94. Once transferred, the relocator 88 reports back to the mode manager the success or failure of the transfer over an IPC channel. The data object can be transferred to either the second data container 94, a third data container 96 or any other data container that can accept data objects. The size of the data object and available space in the second and third containers are used by the mode manager to determine where the data object is to be relocated.

The relocator 88, like the container monitor, is a separate process spawned by the mode manager. However, it exists until it has finished moving a data object from the first container 92 to the second container 94, unlike the container monitor which exists for the lifetime of the container. Numerous relocations can occur while the storage virtualization engine is performing other operations. A relocator is also utilized for transferring a data object from a publishing point to a data container.

Figure 8A:
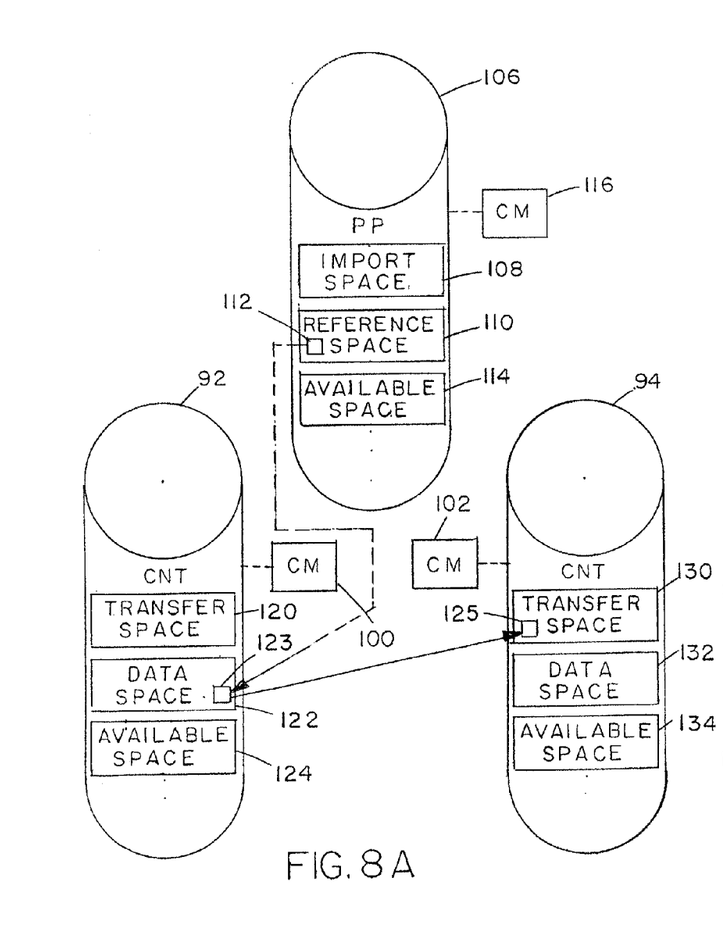
FIG. 8A illustrates the process of copying the data object from a first container to a second container.
Figure 8B:
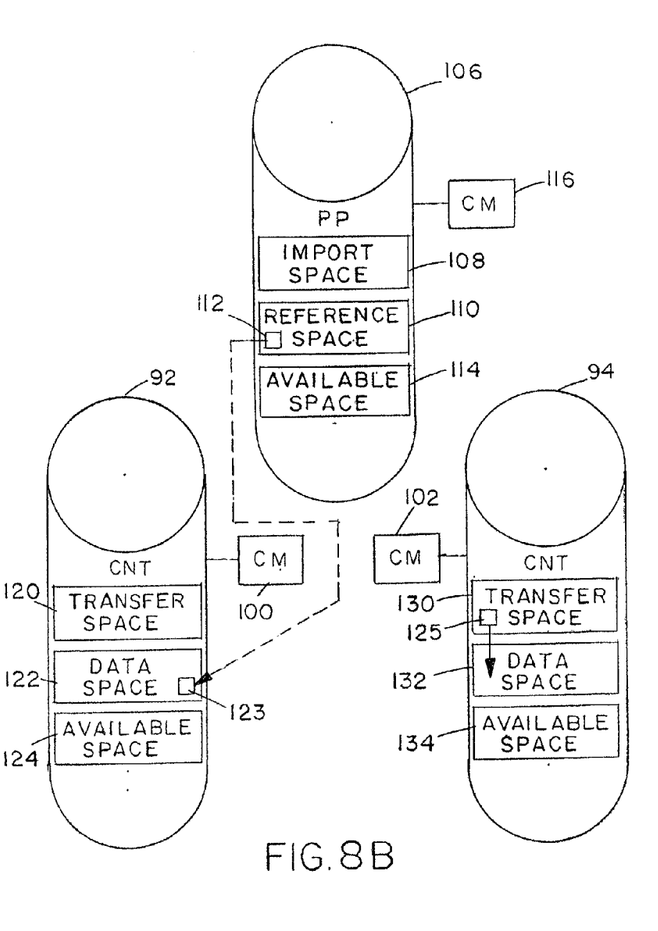
FIG. 8B illustrates the process of storing the data object in the second container.
Figure 8C:
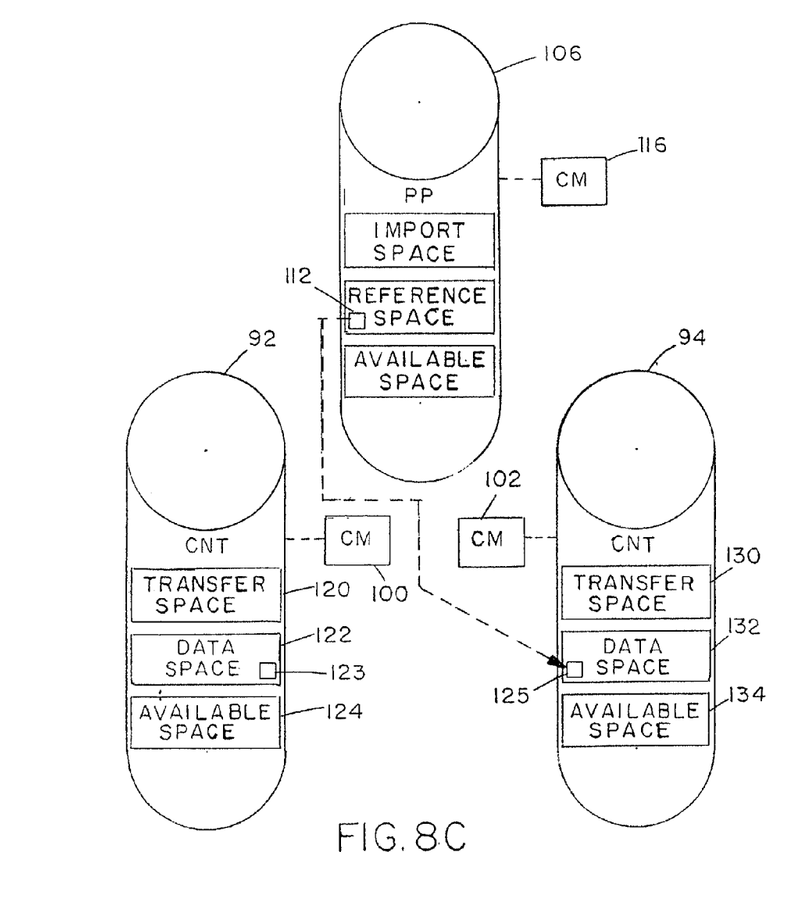
FIG. 8C illustrates the process of updating the publishing point.
Figure 8D:
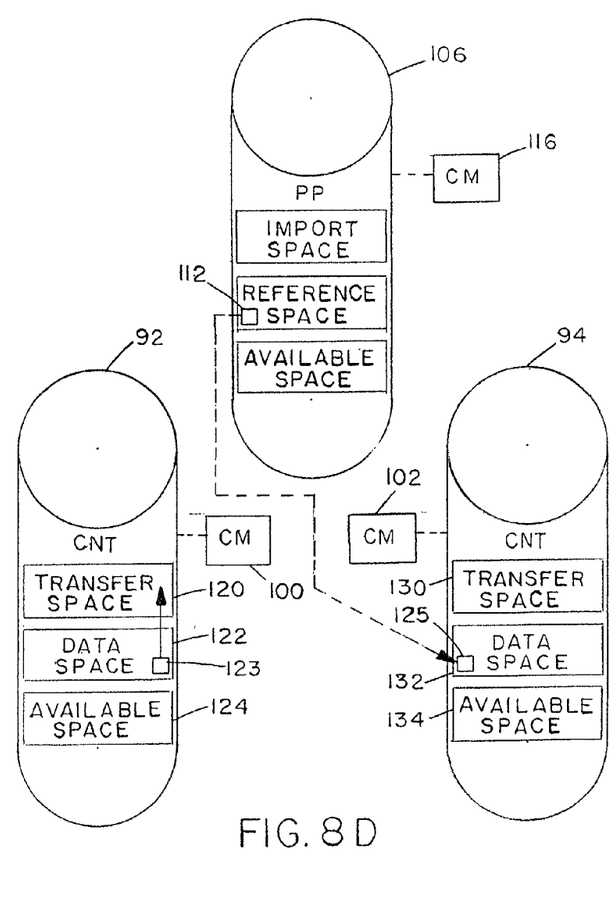
FIG. 8D illustrates the process of moving the data object to the transfer space of the first container.
Figure 8E:
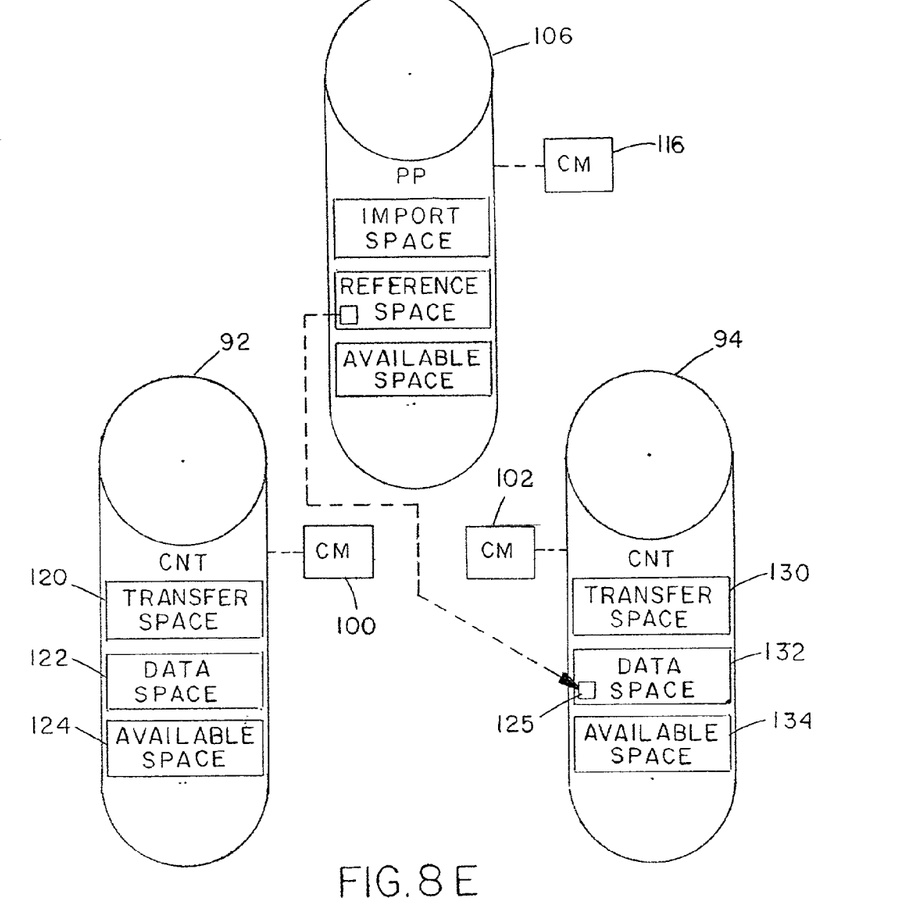
FIG. 8E illustrates the process of removing the data object from the first container.

FIGS. 8A–8E illustrate the process of transferring a data object from the first container 92 to the second container 94. With reference to FIG. 8A, the mode manager process checks the first data container 92 directly, via file system directives, to determine if the first data container 92 has reached its relocation threshold and that a data object needs to be relocated. If a data object needs to be reloated, it decides the optimal data container to relocate the data object to. In this instance, the optimal data container is the second data container 94. The data object 123 located in the data space 122 of the first data container 92, also known as the source data container, is then copied and the copy of the data object 125 is placed in the transfer space 130 of the second data container 94, also known as the target data container. Next, the copy of the data object 125 in the transfer space 130 of the target container 94 is compared to the data object 123 in the data space 122 of the source container 92 to verify the copy matches the original. If a match exists, the relocator process moves the copy of the data object 125 from the transfer space 130 to the data space 132 of the target container 94 as illustrated in FIG. 8B.

Upon completion of relocating the data object 123, the relocator process issues a file system directive to update the reference object 112 stored in the reference space 110 of the publishing point 106. Now the reference object 112 for the relocated data object 123 refers to the copy of the data object 125 in the second container 94, and not the original data object 123 in the first container 92. See FIG. 8C.

After a copy of the data object 125 has been successfully transferred to the second container 94, the relocator process moves the data object 123 to the first data container's transfer space 120, thus deallocating space in the first data container 92. Once this is accomplished, the relocator removes the data object 123 from the first data container's transfer space 120. See FIGS. 8D–8E.

If all the data objects are in the proper data containers, the storage virtualization engine can be turned off and the system operates in an off-line mode. In this mode, the mode manager, container monitors and relocators are all shut down, thus preventing the storage virtualization engine from importing new data objects, balancing the data objects over all the containers, responding to general commands and resizing containers. However, it is still possible to launch the command interface (CI) and query version information, help documentation and get command syntax when in the offline mode.

Once shut down, the storage virtualization engine can be activated to the on-line mode by the operator submitting a startup command which causes the CI to spawn a mode manager which listens for the response from the system. Next, the mode manager begins to listen for system signals, specifically opening an IPC channel to listen for messages from the container monitors and relocators. Furthermore, the mode manager loads the engine configuration settings obtained from a configuration file consulted at startup and determines which publishing points and which data containers are to be created and managed based upon the amount of data stored. Also, the mode manager, at this time, constructs any internal data structures that are necessary to manage the publishing points and containers. Once this is accomplished, the mode manager checks each container and builds a new internal catalog of all data objects and opens the IPC channel to listen for other CI commands. Finally, the mode manager spawns a container monitor for each publishing point and container and returns the results of the startup request to the CI.

The mode manager monitors the relocation threshold by cycling through every publishing point's containers and periodically tests for the relocation threshold. As discussed previously, the relocation threshold is a percentage of the maximum container size. An operator sets the testing interval. If a container is found that has reached its relocation threshold, the mode manager builds a list of data objects to relocate to another container. The list of data objects should be of sufficient size to cause the source container to drop down below its relocation threshold after the data is moved.

To illustrate this process, suppose there is a container with the following properties:

| Max size | extent | relocation threshold |
|---|---|---|
| 1000 g | 100 g | 80 |
| current size | used space | available space |
| 800 g | 700 g | 100 g |

Now, 50 g of data is added into the container which increases the amount of data to 750 g.

| Current size | used space | available space |
|---|---|---|
| 800 g | 750 g | 50 g |

Since available<extent, the container monitor increases the size of the container by 1 extent.

| Current size | used space | available space |
|---|---|---|
| 900 g | 750 g | 150 g |

Now, another 100 g of data is added into the container which increases the amount of data to 850 g.

| current size | used space | available space |
|---|---|---|
| 900 g | 850 g | 50 g |

The mode manager detects that the container is at 85% of its maximum size, but does not relocate data because the container can still increase in size. Once again, available<extent, so the container monitor increases the size of the container by 1 extent.

| current size | used space | available space |
|---|---|---|
| 1000 g | 850 g | 150 g |

The mode manager detects that the container is again at 85% of its maximum size and decides to relocate 55 g of data to another container because the container can no longer increase in size. Relocating the data causes the container to drop below its relocation threshold. When the mode manager decides to relocate data objects, it has entered the load balancing mode. This mode determines where to locate the data objects to optimize space within the containers.

The mode manager builds a relocation list of all the data objects to be relocated by randomly cycling through directories in the containers. Data objects are added to the relocation list if dmin<dsize<dmax, where dmin=smallest data object, set by the operator or end user in the configuration file, which the mode manager will relocate dsize=size of the data object dmax=largest data object, set by the operator or end user in the configuration file, which the mode manager will relocate.

Stability of the data object is also checked by the mode manager. A data object is stable if it has not changed in a certain amount of time. The amount of time is determined by the operator. As a result, if the data object is stable and of suitable size, the mode manager will attempt to relocate it to another container. Data objects are added to the relocation list until the size of all the data objects being relocated exceeds rsize or until there are rmax entries.

Let rsize=amount of data the mode manager needs to relocate

Let rmax=maximum number of data objects, set by the operator or end user in the configuration file, the mode manager will simultaneously relocate.

Once it has been determined that a data object requires relocation, a suitable data container must be found. To find such a data container, the mode manager checks each data container in use by the publishing point and selects the one with the most available space. If there is room for the data object, the mode manager spawns a relocator. As discussed previously, the relocator manages the relocation of the data object from the first data container 92 to the second data container 94. If there is not enough available space for the data object in any data container, then the mode manager creates a new data container (by obtaining storage from the storage pool) and relocates the data object to the new data container. This procedure is repeated for each data object on the relocation list, ensuring that the content load is balanced across all the data containers.

Other heuristics of the system include tracking how much data is being relocated to a particular data container to prevent the mode manager from relocating so much data to another data container that it exceeds its relocation threshold. If the amount of data to be relocated is too large to fit in a single target data container, the mode manager will relocate data from one container to multiple containers simultaneously. Once a data container has been selected as a target for relocation, the mode manager will not use it as a target for other data containers that are at threshold so, the target data container does not exceed its own relocation threshold while receiving data from another data container.

In addition to finding the appropriate data container for relocating the data, the mode manager monitors the progress of each relocator. If a relocator should fail to relocate a data object for some reason, the mode manager will spawn another relocator to move it. If the data object on the source container changed during relocation, the mode manager will leave the data object in place and simply select an alternative stable data object to relocate.

Periodically the mode manager checks each publishing point's import space for data objects. If a data object is found and it is determined to be stable, it will be relocated to one of the publishing point's data containers. The operator can configure how often the publishing point's import space is polled for new data objects. If a data object has existed in the import space since the last polling cycle without changing, it is said to be stable and suitable for importation.

The mode manager employs the same technique for importing a data object as it does when relocating a data object from a data container at threshold. It finds an available data container and spawns a relocator. As discussed previously, the mode manager balances the data objects among all the containers to optimize the space. The mode manager also services operator commands submitted via the command interface. Many of these commands will query the current state of the system. The mode manager consults internal data structures and executes the necessary system commands to service whatever request the operator has made. The result of all commands are always returned to the command interface via the command interface's IPC channel.

Figure 9:
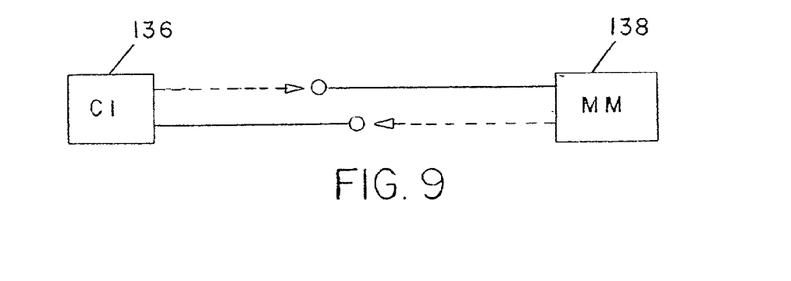
FIG. 9 illustrates communication between the command interface and the mode manager.
Figure 10A:
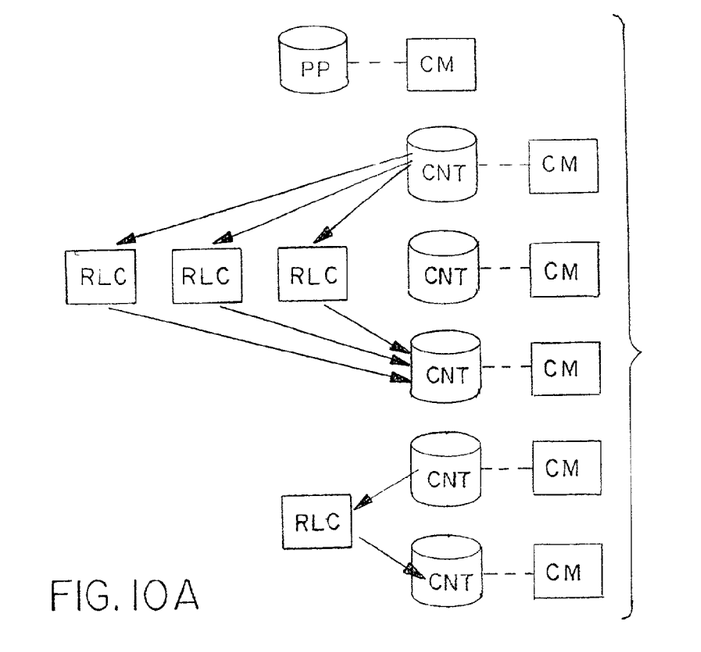
FIG. 10A illustrates the mode manager receiving a shut down command.
Figure 10B:
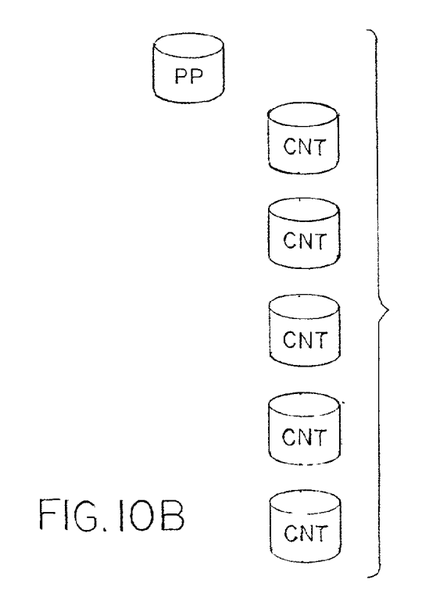
FIG. 10B illustrates the shut down of all the container monitors and relocators.

FIGS. 9, 10A and 10B illustrate the storage virtualization engine in shut down mode. The first step requires a CI 136 sending a shut down command to the mode manager 138. When the mode manager 138 receives this request, it terminates all the container monitors and relocators and then finally shuts itself down. As described previously, this places the storage virtualization engine in offline mode.

Although an exemplary embodiment of the invention has been described above by way of example only, it will be understood by those skilled in the field that modifications may be made to the disclosed embodiment without departing from the scope of the invention, which is defined by the appended claims.

The invention claimed is:

1. A system for dynamic file allocation, comprising:
an input device for receiving a data object;
a reference container, coupled to the input device, for directing the data object to a location in a storage object, coupled to the reference container, the reference container comprising a publishing point which contains a virtual mapping system that directs the data object to an entry in the storage object;
the storage object comprising a plurality of data containers;
the virtual mapping system comprising a reference object which is assigned to the data object and comprises a set of bits defining the location of the data object in the plurality of data containers where the data object is located;
each data container in the plurality of data containers comprising a transfer space to temporarily store data objects being relocated, a data space, coupled to the transfer space, to store the data object, and an available space, coupled to the data space, containing unused space;
the publishing point comprising an import space for temporarily storing the data object, a reference space, coupled to the import space, for storing the reference objects, and an available space, coupled to the reference space, containing unused storage in the publishing point;
the data object being selected from a group consisting of a byte, a file, and a directory;
each data container in the plurality of data containers obtaining storage from a storage pool, wherein the size of the storage pool can be increased by adding more storage, and wherein power is not disrupted in the file system and wherein an operator sets a maximum size to each data container in the plurality of data containers; and
the operator setting a relocation threshold on the each data container in the plurality of data containers, which indicates when the data object is to be relocated from a first data container in the plurality of data containers to a second data container in the plurality of data containers.

2. The system of claim 1, wherein the each data container in the plurality of data containers returns unused storage to the storage pool.

3. The system of claim 1, wherein the relocation threshold is a percentage of the maximum allowable size of the each data container in the plurality of data containers.

4. The system of claim 1, wherein the data object to be relocated from the first data container is placed in the transfer space of the second data container.

5. The system of claim 4, wherein the data object is relocated from the first data container to the second data container without the knowledge of an application running on the system.

6. A system for dynamic file allocation, comprising:
an input device for receiving a data object;
a reference container, coupled to the input device, for directing the data object to a location in a storage object, coupled to the reference container, the reference container comprising a publishing point which contains a virtual mapping system that directs the data object to an entry in the storage object;
the storage object comprising a plurality of data containers;
each data container in the plurality of data containers is being coupled to a container monitor to monitor that the each data container in the plurality of data containers has adequate available space.

7. The system of claim 6, wherein a mode manager, coupled to the publishing point, maintains all internal data structures tracking the publishing point, the plurality of data containers and the data object.

8. The system of claim 7, wherein a relocator is spawned by the mode manager to assist with the relocation of the data object.

9. A method of dynamically allocating a data object in a file system, the method comprising the steps of:
detecting a data object to be relocated in a data space of a source data container;
copying the data object to the transfer space of a target data container;
transferring the data object from the transfer space of the target data container to the data space of the target data container;
updating a reference object to indicate the address of the data object in the target data container;
storing the reference object in a reference space in a publishing point;
spawning a relocator to manage the transfer of the data object from the source data container to the target data container;
the relocator updating the reference objects;
verifying the copy of the data object in the source data container is identical to the data object in the target data container;
moving the data object in the data space in the source data container to the transfer space in the source data container; and
removing the data object from the transfer space of the source data container to increase available space in the source data container for additional data objects.

10. The method of claim 9, wherein the relocator moves the data object in the source data container to the transfer space and then removes the data object from the source data container.

11. The method of claim 10, wherein a mode manager cycles through the source data container and the target data container to test for a relocation threshold.

12. The method of claim 11, wherein an operator sets a time interval to test the relocation threshold.

13. The method of claim 11, further comprising the steps of building a list of data objects from the source data container to relocate to the target data container, wherein data objects are put onto the list if the source data container has reached its relocation threshold.

14. The method of claim 13, wherein the data object that is relocated is of sufficient size to cause the source data container to drop below its relocation threshold.

15. The method of claim 14, further comprising the step of increasing the size of the source data container by obtaining additional space from a storage pool.

16. The method of claim 15, wherein the mode manager determines where to relocate the data object and spawns the relocator to assist in the relocation.

17. The method of claim 16, wherein the mode manager polls the import space of the publishing point for the data object to be relocated and wherein the operator sets a time interval for polling the import space.

18. The method of claim 16, wherein the data object is relocated to multiple data containers if the size of the data object is too large to fit into a single data container.

19. A method of dynamically allocating a data object in a file system, the method comprising the steps of:
   entering the data object into an input device;
   storing the data object in an import space of a publishing point, wherein additional storage space is acquired from an available space of the publishing point if there is not enough space in the import space;
   assigning a reference object to the data object;
   relocating the data object to a transfer space of a data container chosen from a plurality of data containers;
   the reference object indicating the address in the data container where the data object is stored;
   the reference object being transferred from the import space of the publishing point to the reference space of the publishing point;
   a mode manager spawning a relocator to assist in relocating the data object from the import space of the publishing point to the transfer space of the data container;
   the mode manager cycling through each container in the plurality of data containers to test for a relocation threshold; and
   an operator setting a time interval to test the relocation threshold.

20. The method of claim 19, further comprising the steps of:
   moving the data object from the transfer space of the data container to the data space of the data container; and
   updating the reference object with the address of the data object in the data container.

21. The method of claim 20, wherein the data object is relocated to multiple data containers if the size of the data object is too large to fit into a single container.

22. The method of claim 21, wherein the mode manager polls the import space of the publishing point for the data object to be relocated and wherein the operator sets a time for polling the import space.

23. The method of claim 19, wherein the mode manager spawns a relocator for each data object in the plurality of data containers.

* * * * *